United States Patent
Borfigat et al.

(10) Patent No.: US 11,177,734 B2
(45) Date of Patent: Nov. 16, 2021

(54) DIGITAL LIKE SHORT CIRCUIT TO GROUND PROTECTION FOR DC-DC CONVERTER

(71) Applicant: Dialog Semiconductor (UK) Limited, Reading (GB)

(72) Inventors: Nicolas Borfigat, Edinburgh (GB); Guillaume deCremoux, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/744,372

(22) Filed: Jun. 19, 2015

(65) Prior Publication Data

US 2016/0373002 A1    Dec. 22, 2016

(51) Int. Cl.
H02M 1/32      (2007.01)
H02M 3/156     (2006.01)

(52) U.S. Cl.
CPC ............. *H02M 1/32* (2013.01); *H02M 3/156* (2013.01)

(58) Field of Classification Search
CPC ...... H02M 3/156; H02M 3/1588; H02M 1/32; H02M 3/04
See application file for complete search history.

(56) References Cited

U.S. PATENT DOCUMENTS

| | | | | |
|---|---|---|---|---|
| 7,035,071 B1* | 4/2006 | Tiew | ...................... | H02M 3/157 361/93.9 |
| 7,541,795 B1* | 6/2009 | Smith | ...................... | H02M 1/32 323/285 |
| 8,913,363 B2* | 12/2014 | Takata | ...................... | H02M 1/32 361/93.2 |
| 2005/0237688 A1 | 10/2005 | Wong et al. | | |
| 2007/0008748 A1 | 1/2007 | Tang | | |
| 2008/0266738 A1 | 10/2008 | Kimber | | |
| 2010/0244572 A1* | 9/2010 | Sharma | ............... | H02M 3/1588 307/80 |
| 2011/0058285 A1 | 3/2011 | Wibben | | |

(Continued)

OTHER PUBLICATIONS

"Novel short-circuit protection technique for DC-DC buck converters," by Yajun Li et al., IET Circuits Devices Systems, vol. 8, Issue 2, Mar. 2014, pp. 90-99, www.ietdl.org.

(Continued)

*Primary Examiner* — Kyle J Moody
*Assistant Examiner* — Jye-June Lee
(74) *Attorney, Agent, or Firm* — Saile Ackerman LLC; Stephen B. Ackerman (57) ABSTRACT

An adaptive method to protect a DC to DC buck converter from destruction in the event of a short circuit to ground at the output is described. The short circuit protection method is small and inexpensive, and uses very low current, allowing the buck converter to remain active and protected, as it self regulates below an acceptable maximum peak current. Inductor current is sensed in the current-mode loop circuitry and an over-current comparator is used. A masking interval generator is required to mask false over-current triggers caused by converter switching-induced glitches. Simple logic is used to detect if the current-limit comparator indicates over-current at the end of the masking interval and to implement over-current pulse-skipping on genuine over-current detection.

17 Claims, 7 Drawing Sheets

(56) References Cited

U.S. PATENT DOCUMENTS

| | | | |
|---|---|---|---|
| 2011/0291634 A1 | 12/2011 | Takata et al. | |
| 2012/0286754 A1* | 11/2012 | Chen .................. | H02M 3/1588 323/284 |
| 2016/0049859 A1 | 2/2016 | de Cremoux et al. | |

OTHER PUBLICATIONS

Texas Instruments TPS10222, 1.6-A, 1.25-MHz Buck Converter in a 3 mm × 3 mm Son Package, SLUS642A—Oct. 2005—Revised Jan. 2006, www.ti.com, 28 pgs.

Co-pending US Patent DS13-099, U.S. Appl. No. 14/468,588, filed Aug. 26, 2014, by Guillaume De Cremoux et al., Digital Pulse Skipping Modulation for Buck Converter with Auto-Transition to Pulse Frequency Modulation (PFM), 32 pgs.

German Office Action, File No. 10 2015 222 008.7, Applicant: Dialog Semiconductor (UK) Limited, dated Oct. 21, 2020, 14 pages.

\* cited by examiner

DIGITAL LIKE SHORT CIRCUIT TO GROUND PROTECTION FOR DC-DC CONVERTER

RELATED PATENT APPLICATION

This application is related to U.S. patent application Ser. No. 14/468,588, filed on Aug. 26, 2014, which is assigned to a common assignee, and is herein incorporated by reference in its entirety.

FIELD

The present disclosure relates generally to DC-DC converters and more specifically to current loop mode control, and the detection of and protection against short circuit conditions at the converter output.

BACKGROUND

In power conversion solutions, using, for example, DC to DC buck converters, over-current detection and limiting schemes exist of varying utility and effectiveness.

Figure 1:
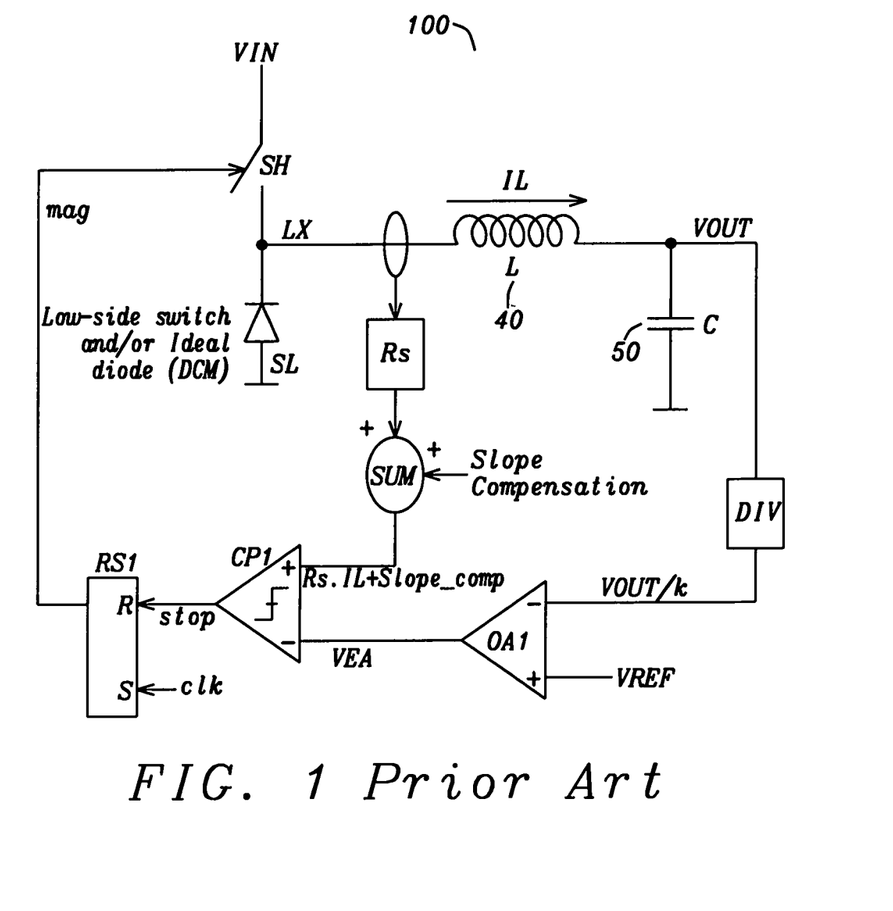
FIG. 1 is a circuit schematic of a typical buck converter with current mode regulation loop.

FIG. 1 is a circuit schematic of a typical buck converter with current mode regulation loop. The buck converter comprises an input voltage VIN, an output voltage VOUT, inductor L 40, capacitor C 50, high side switch SH, and low side switch SL. The regulation loop comprises a divider DIV, an operational amplifier OA1 with inputs VOUT/K and VREF, a current sensor RS, a sum function SUM with SLOPE_COMP, a comparator CP1 with positive input RS.IL+SLOPE_COMP and negative input VEA, and flip-flop RS1, which provides output signal MAG to the high side of switch SH. When operating in pulse width modulation (PWM) of constant frequency, a clock CLK periodically issued sets magnetization MAG signal to '1'. The inductor current IL through inductor L 40 is sensed and converted to voltage RS.IL, by multiplication of RS. At times, a slope-compensation SLOPE_COMP is added to voltage RS.IL. The comparator CP1 emits signal STOP, and forces magnetization MAG signal to '0', when the total voltage (RS.IL+SLOPE_COMP) exceeds error voltage VEA. VEA sets the target for the maximum inductor current, also called the peak current. Voltage VEA is regulated by the error operational amplifier OA1 to adjust the required peak inductor current to regulate VOUT to a value proportional to VREF. VREF could be generated with a VDAC digital-to-analog converter, using a digital controller. The output voltage of such a buck converter is a voltage supply for other sub-systems.

Figure 2:
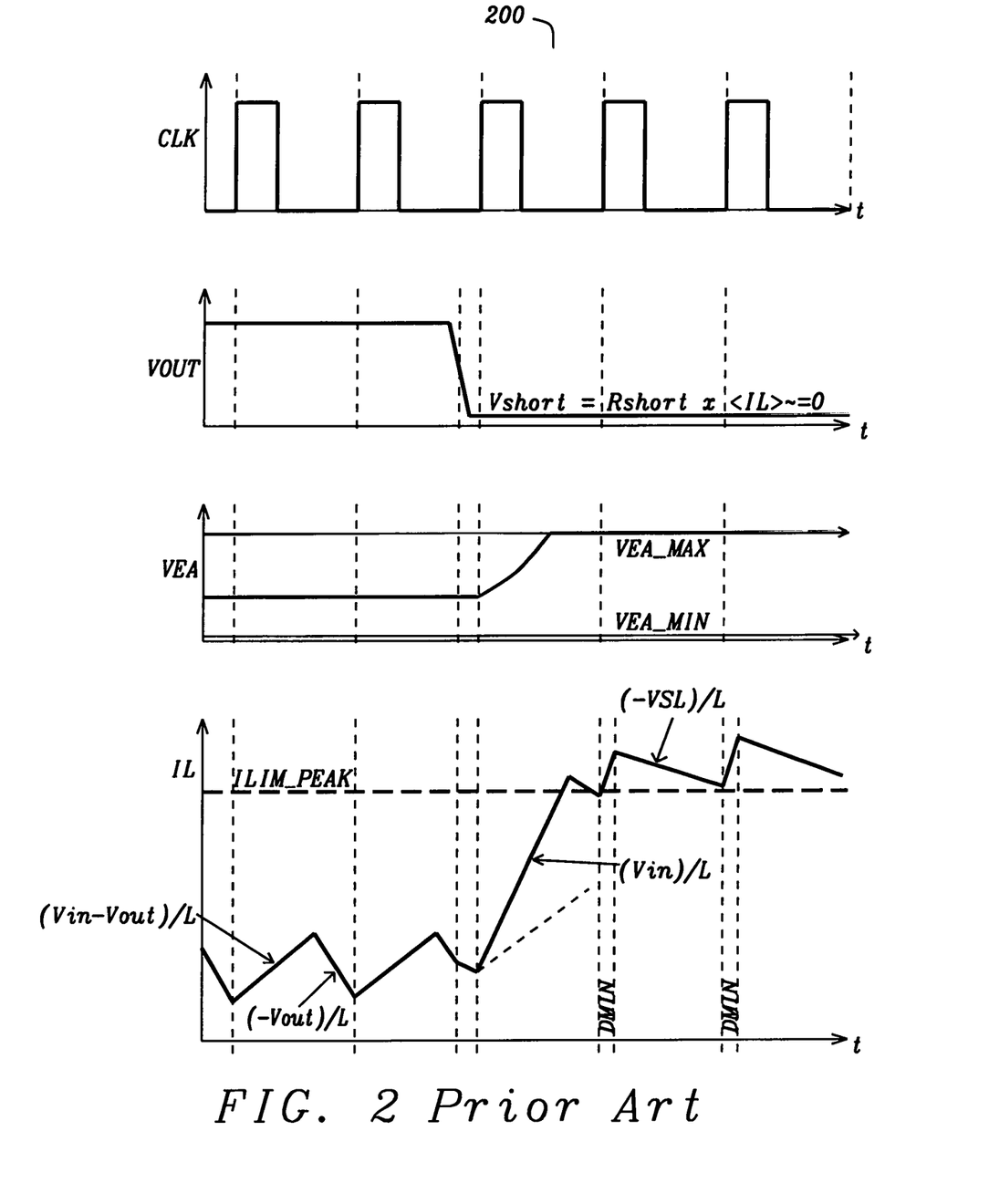
FIG. 2 is a timing diagram of a short circuit event description and the effect on VEA, IL, and VOUT of the buck converter.

FIG. 2 illustrates a timing diagram of a short circuit event description and the effect on VEA, IL, and VOUT of the buck converter in FIG. 1. The first cycle shows the buck converter is regulating at a given VOUT with a magnetization phase triggered by a rising edge of the clock CLK followed by a demagnetization phase. The inductor current IL varies with an up slope rate of (VIN−VOUT)/L and a down slope rate of (−VOUT)/L, assuming VSL=0V. At the end of the second clock cycle, the short circuit occurs and VOUT is pulled down close to 0V. The short circuit occurs while in a demagnetization phase, and when the inductor current down slope is (−VOUT)/L. If VOUT is shorted to ground, the demagnetization down slope becomes (−VSL)/L, and if SL in FIG. 1 is a diode switch, the down slope becomes (−RSL.IL)/L. The error voltage VEA jumps to its maximum as VOUT drops. This forces the control loop to its maximum duty cycle and full magnetization. In addition, most buck converters have a peak current limit protection. If the inductor current goes above this peak current limit, then demagnetization is ordered even if the loop compensation still requires a magnetization. The third cycle shows that the magnetization goes up with a rate of (VIN)/L until it reaches the peak current limit ILIM_PEAK, which causes demagnetization to start. The inductor current always goes slightly above the peak current limit due to the internal delay detecting the limit and commanding a turn off of the magnetization phase. When VOUT falls close to 0V, there is almost no decrease of the inductor current during the demagnetization phase, and the down slope is (−VSL)/L. Consequently cycle after cycle the inductor current IL is going to increase over and over. This causes the inductor to overheat until it eventually damages itself and/or the buck converter. The theoretical final settling value for IL is DMIN.VIN/L= (1−DMIN).RSL.IL/L, which gives IL=DMIN.VIN/(RSL. (1−DMIN))), where DMIN is the minimum achievable duty-cycle for a proper ILIMmax detection. For example when DMIN=0.1, RSL=0.02, and VIN=5, IL=27.7A. It is necessary then to avoid this inductor current runaway when there is a short circuit on the output of the buck converter.

In prior art what can be encountered often is a second peak current limit, higher than the first. If the first current limit is triggered for a given clock cycle, then at the next cycle, the second peak current limit circuit will be ON and ready to detect an abnormal peak current, caused by the short circuit. The triggering of the second peak current limit would raise a flag to the digital controller, which would then turn off the buck converter. After some time the buck converter would be re-enabled and the same sequence would occur again until the short circuit stops. In the presence of a short circuit at the output, this sequence is necessary to avoid destruction of the inductor and/or the buck converter. In this way, the buck converter would not be able to provide a constant supply voltage to other systems in the presence of a short circuit.

In addition, the prior art shows the use of analog components that are power hungry. A peak current limit detector usually requires a fast comparator with an associated current reference. These elements are unfortunately large in terms of silicon area. The peak current limit requires a current sensor, which is usually 1/100 of the high side pass device.

SUMMARY

Accordingly, it is an object of one or more embodiments of the present disclosure to provide a circuit and a method to protect a buck converter from destruction in the event of a short circuit to ground at the output.

It is a further object of one or more embodiments of the disclosure to implement a low current limit, not much higher than the intended maximum safe operating current.

It is a further object of one or more embodiments of the disclosure to implement fast detection of an over-current due to a short and to achieve a fast frequency ramp-down.

It is a further object of one or more embodiments of the disclosure to implement a smooth loop recovery on removal of a short, and to prevent the converter from being put back into maximum frequency mode if it ramps to a high over-current again, providing a natural soft-restart from overcurrent due to a short. Other objects will appear hereinafter.

The above and other objects of the present disclosure may be accomplished in the following manner. Inductor current is sensed in the current-mode loop circuitry and an over-current comparator is used. A masking interval generator is required to mask false over-current triggers caused by converter switching-induced glitches. Simple logic is used to detect if the current-limit comparator indicates over-current at the end of the masking interval and to implement over-current pulse-skipping on genuine over-current detection. This method reuses existing analog circuits to gain over-current protection. Only a small amount of additional digital logic is required to handle over-current pulse skipping and recovery.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DESCRIPTION

Figure 3:
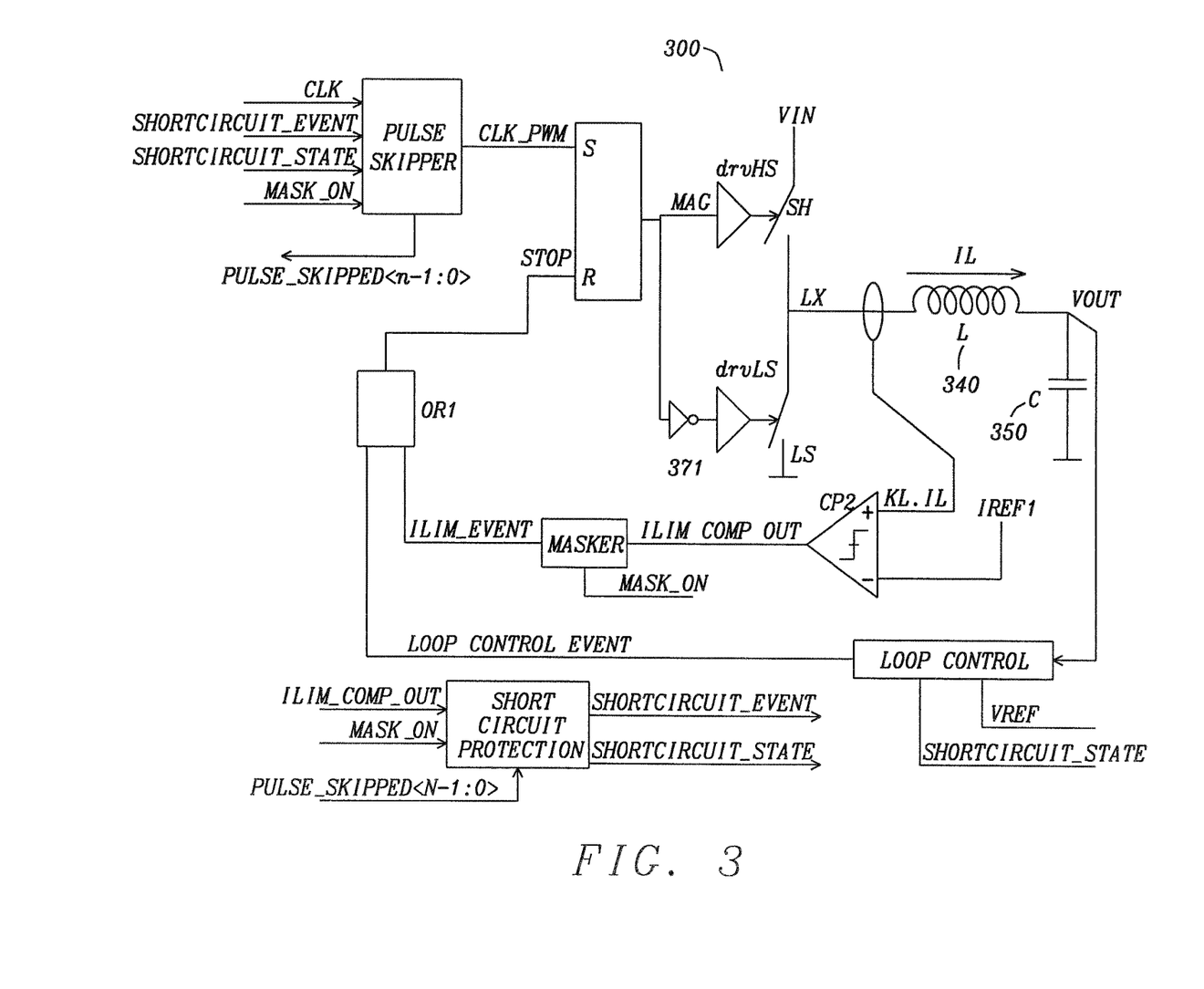
FIG. 3 is a circuit schematic of a buck converter illustrating the principle of short circuit protection, in a first preferred embodiment of the present disclosure.

FIG. 3 is a circuit schematic of a buck converter illustrating the principle of short circuit protection, in a first preferred embodiment of the present disclosure. The buck converter comprises an input voltage VIN, an output voltage VOUT, inductor L 340, and capacitor C 350. The buck converter also comprises switches SH and LS, driven by DRVHS and DRVLS, respectively. The regulation loop comprises a LOOP CONTROL, with input signals VREF and SHORTCIRCUIT_STATE, and a comparator CP2, with positive input KL.IL and negative input IREF1. The regulation loop also comprises a flip-flop RS2, which provides output signal MAG, to drive the high side of switch SH, and is inverted in 371, to drive switch LS.

The major part of the short circuit detection scheme operates with comparator CP2 comparing an image of the inductor current KL.IL, where KL.IL is proportional to the current flowing through switch SH, to a predefined reference IREF1. Comparator CP2 could be a current or voltage comparator. During normal operation of the buck converter, the transition from demagnetization (SH OFF and LS ON) to magnetization (SH ON and LS OFF) causes the LX voltage to ring, due to parasitics at the LX node. Consequently all sensed currents and voltages around these transitions must be properly handled in order to avoid false triggering of the current limit ILIM_EVENT. In order to ensure a proper detection of the peak current limit ILIM_COMP_OUT, from comparator CP2, a MASKER is used. The MASKER will mask the information provided by comparator CP2 for the first few nanoseconds of the magnetization phase, as is known in the art. This delay lets the input signals ILIM_COMP_OUT and MASK_ON settle before being compared. In normal operation, the triggering of comparator CP2 right after MASK_ON goes low never occurs.

In the event of a short circuit at VOUT, the current of inductor L, KL.IL, will rapidly build up and comparator CP2 will be triggered as soon as MASK_ON goes low. Signal ILIM_COMP_OUT high sets signal ILIM_EVENT high, and ORI emits signal STOP, forcing magnetization MAG signal to '0'. Signals MASK_ON and ILIM_COMP_OUT are also used to set signals SHORTCIRCUIT_STATE and LOOP_CONTROL_EVENT, in the regulation loop when a short circuit event is detected. In this way, MASK_ON and ILIM_COMP_OUT are used to detect a short circuit event in the buck converter.

Once a short circuit event has been detected, many systems turn off the DC to DC buck converter for a given amount of time before turning it back on, and check to see if the short-circuit is still present. Often the buck converter will have a pulse skipping or frequency fold back scheme. It consists of a system, which skips pulses to emulate a lower switching frequency. It is particularly applicable when the output current load is very light and the switching losses prevail in terms of efficiency. The PULSE SKIPPER of FIG. 3 is described in, for example, Related U.S. patent application Ser. No. 14/468,588, filed on Aug. 26, 2014, which is herein incorporated by reference in its entirety. The pulse skipper function aids in generating a constant minimal inductor peak current, and is configured to provide a method of skipping pulses utilizing a pulse skipping modulation (PSM) mode of operation. PULSE SKIPPER comprises a peak current loop configured to provide a method of auto-transition from pulse skipping modulation to a pulse frequency modulation (PFM).

In the event of a short circuit to ground detection, the buck converter enters pulse skip mode, triggering PULSE_SKIPPED to limit the inductor peak current. The switching frequency of the clock would adjust to ensure that the peak current limit is not hit too soon in the cycle. The duty-cycle D, of the active signal, cannot be lower than DMIN, the minimum achievable duty-cycle.

Since DMIN.VIN/L=(1−DMIN).RSL.IL/L, this implies IL=D.VIN/(RSL.(1−D)). To lower IL and avoid runaway current, DMIN would need to lowered, so that D can decrease too. DMIN is given by fixed duration for a fixed masking time, and if divided by N the frequency fold back ratio, then D is limited by DMIN/N. To bring IL back down to ILIM_PEAK then, ILIM_PEAK=D.VIN/(RSL.(1−D)) and we obtain D=DMIN/N=RSL.ILIM_PEAK/(VIN+ILIM_PEAK.RSL). KL.IL as shown in FIG. 3 and RS.IL as shown in FIG. 1 are similar, since they both represent an image of the inductor current IL. However RS.IL is a voltage and KL.IL is a current. KL can have a range of values. For example, for KL=1 and a current limit at 10 A, then IREF1=10 A. However, a preferred value of KL would be in the $\frac{1}{10000}$ range, to reduce the value of IREF1 so as to improve efficiency.

The idea of PULSE SKIPPER is to detect when the duty-cycle is either intended to be shorter, or detected to be longer, than DMIN/N. Then N is regulated to stay at the edge of these two conditions, for duty-cycle abutting on DMIN/N. Both signals MASK_ON and ILIM_COMP_OUT are used for this purpose. If ILIM_COMP_OUT is high when MASK_ON goes low then the switching frequency is decreased, a pulse is skipped, and PULSE_SKIPPED=1. On the contrary if ILIM_COMP_OUT is low when MASK_ON goes low the switching frequency is increased and no pulse is skipped, and PULSE_SKIPPED=0. The output of the comparator is masked to avoid any false triggering event to occur due to the LX node voltage ringing and reference settling. Exiting the short circuit state would happen naturally. Indeed if the switching frequency is back to normal for more than a predefined amount of clock cycles, then the short circuit is considered finished.

Figure 4:
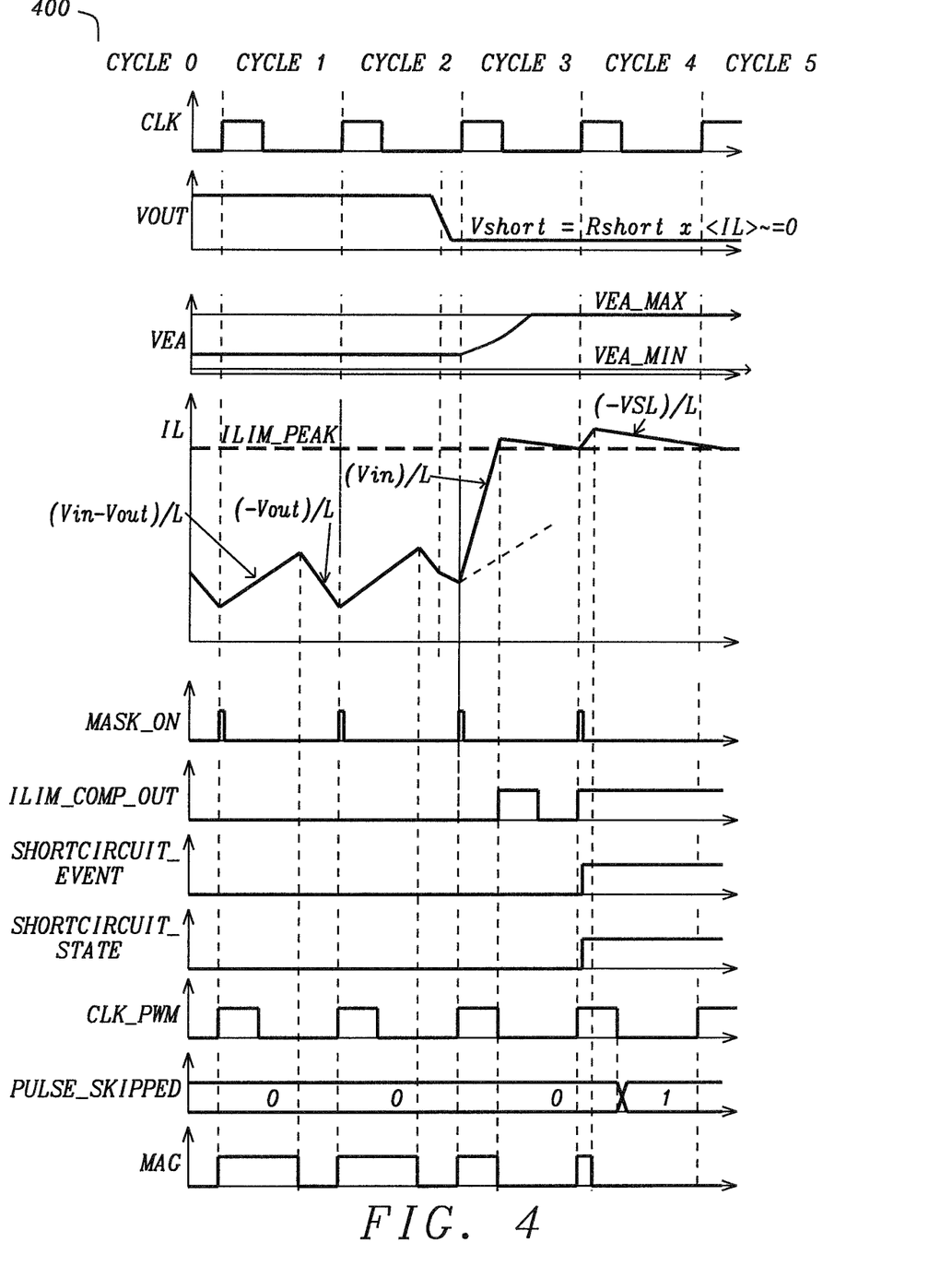
FIG. 4 is a timing diagram illustrating the detection of short circuit protection, in a first preferred embodiment of the present disclosure.

FIG. 4 is a timing diagram illustrating the detection of short circuit protection, in a first preferred embodiment of the present disclosure. During Cycle 0, VOUT is settled close to its targeted voltage defined by VREF, and VEA is settled too. IL is decreasing at a rate of (-VOUT/L) for the demagnetization phase. There is no short circuit event, SHORTCIRCUIT_EVENT=0, and no pulse skipped, PULSE_SKIPPED=0.

During Cycle 1, CLK (=CLK_PWM as there is no pulse skipped) comes up which triggers MAG. VOUT remains around its expected target and VEA remains constant. IL is increasing at a rate of (VIN−VOUT)/L for the magnetization phase. MASK_ON comes up then down, and IL_COMP_OUT remains low as IL<ILIM_PEAK. At roughly 75% of the clock period set by CLK_PWM, MAG goes down forcing the buck converter into the demagnetization phase. IL decreases at a rate of (-VOUT/L) for the demagnetization phase. There is no short circuit event, SHORTCIRCUIT_EVENT=0, and no pulse is skipped, PULSE_SKIPPED=0.

During Cycle 2, CLK (=CLK_PWM as there is no pulse skipped) comes up which triggers MAG. VOUT remains around its expected target, so VEA remains constant. IL is increasing at a rate of (VIN−VOUT)/L for the magnetization phase. MASK_ON comes up then down, and IL_COMP_OUT remains low as IL<ILIM_PEAK. At roughly 75% of the period set by CLK_PWM, MAG goes down forcing the buck converter into the demagnetization phase. IL decreases at a rate of (-VOUT/L) for the demagnetization phase. Suddenly, for example, toward the end of Cycle 2 a short occurs at VOUT and VOUT drops to a value VSHORT=0V. This has a direct effect on VEA, which slowly starts increasing, at a rate set by the loop bandwidth. The buck converter remains in the demagnetization phase with a rate of (-VOUT)/L=(-VSL)/L with VSHORT~=0V. There is only a smooth demagnetization and the level of current IL decreases very slowly.

During Cycle 3, CLK (=CLK_PWM as there is no pulse skipped) comes up which triggers MAG. VOUT remains shorted and VEA has dramatically increased. IL has remained quite high as there was almost no demagnetization of the inductor during the previous demagnetization phase. IL is increasing at a rate of (VIN−VOUT)/L, approaching VIN/L. MASK_ON comes up then down, and IL_COMP_OUT remains low as IL<ILIM_PEAK. Very quickly due to the high rate at which the inductor is magnetized, IL=ILIM_PEAK. Consequently IL_COMP_OUT goes up and the magnetization stops a little above ILIM_PEAK, due to the internal delays within the circuit controls. The demagnetization starts and as in cycle 2, IL decreases very slowly.

During Cycle 4, CLK (=CLK_PWM as there is no pulse skipped) comes up which triggers MAG. VOUT remains shorted and VEA has reached its maximum VEA_MAX. IL has remained quite high as there was almost no demagnetization of the inductor during the previous demagnetization phase. IL is increasing at a rate of (VIN−VOUT)/L, approaching VIN/L. IL becomes bigger than ILIM_PEAK in few nanoseconds. MASK_ON comes up with CLK_PWM and then goes low. As MASK_ON goes low, IL_COMP_OUT has already triggered high due to IL>ILIM_PEAK. IL_COMP_OUT stops the magnetization and the demagnetization starts shortly after this. ILIM_COMP_OUT being high when MASK_ON goes low triggers SHORTCIRCUIT_EVENT and SHORTCIRCUIT_STATE high. Because both SHORTCIRCUIT_EVENT and SHORTCIRCUIT_STATE are high, the pulse skipper is enabled. CLK_PWM going low causes PULSE_SKIPPED to program 1 pulse to skip the next time that CLK comes up.

Figure 5:
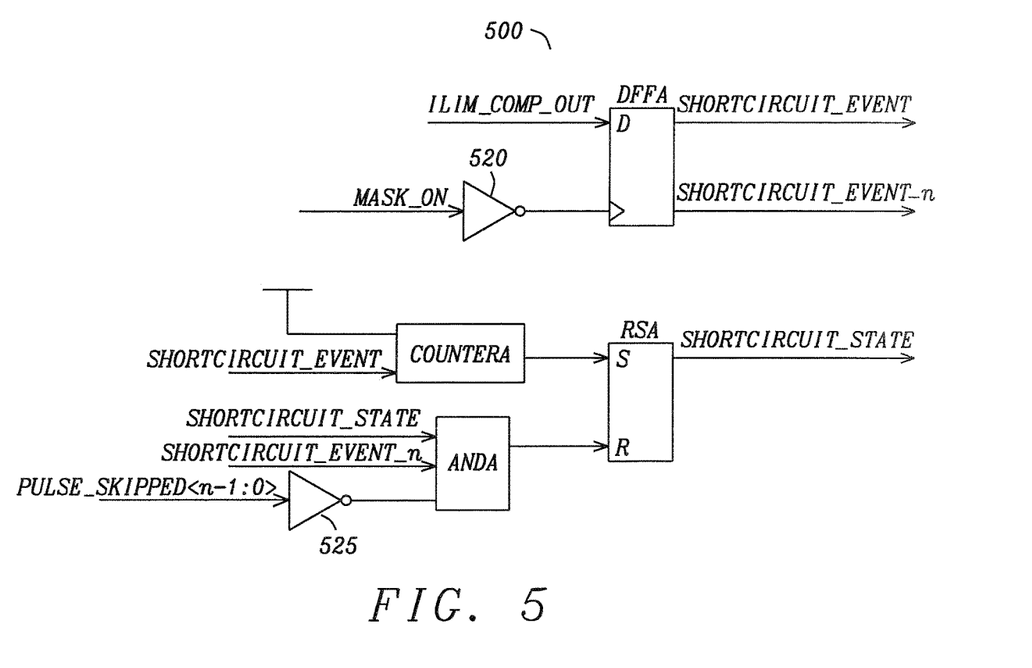
FIG. 5 is a circuit schematic for generating signals based on the short circuit protection event and state, in a first preferred embodiment of the present disclosure.

FIG. 5 is a circuit schematic for generating signals based on a short circuit protection event and state, in a first preferred embodiment of the present disclosure. If the inductor current IL is greater than its peak limit ILIM_PEAK, IL_COMP_OUT is triggered high. When input IL_COMP_OUT is high, and input MASK_ON is low and inverted by 520, flip-flop DFFA sets SHORTCIRCUIT_EVENT high. SHORTCIRCUIT_EVENT high in turn sets SHORTCIRCUIT_STATE high, by means of COUNTERA and flip-flop RSA, stopping the magnetization, in the short circuit detection controls of the buck converter. When both SHORTCIRCUIT_EVENT and SHORTCIRCUIT_STATE are high, the pulse skipper is enabled in the over-current limitation controls of the buck converter.

Figure 6:
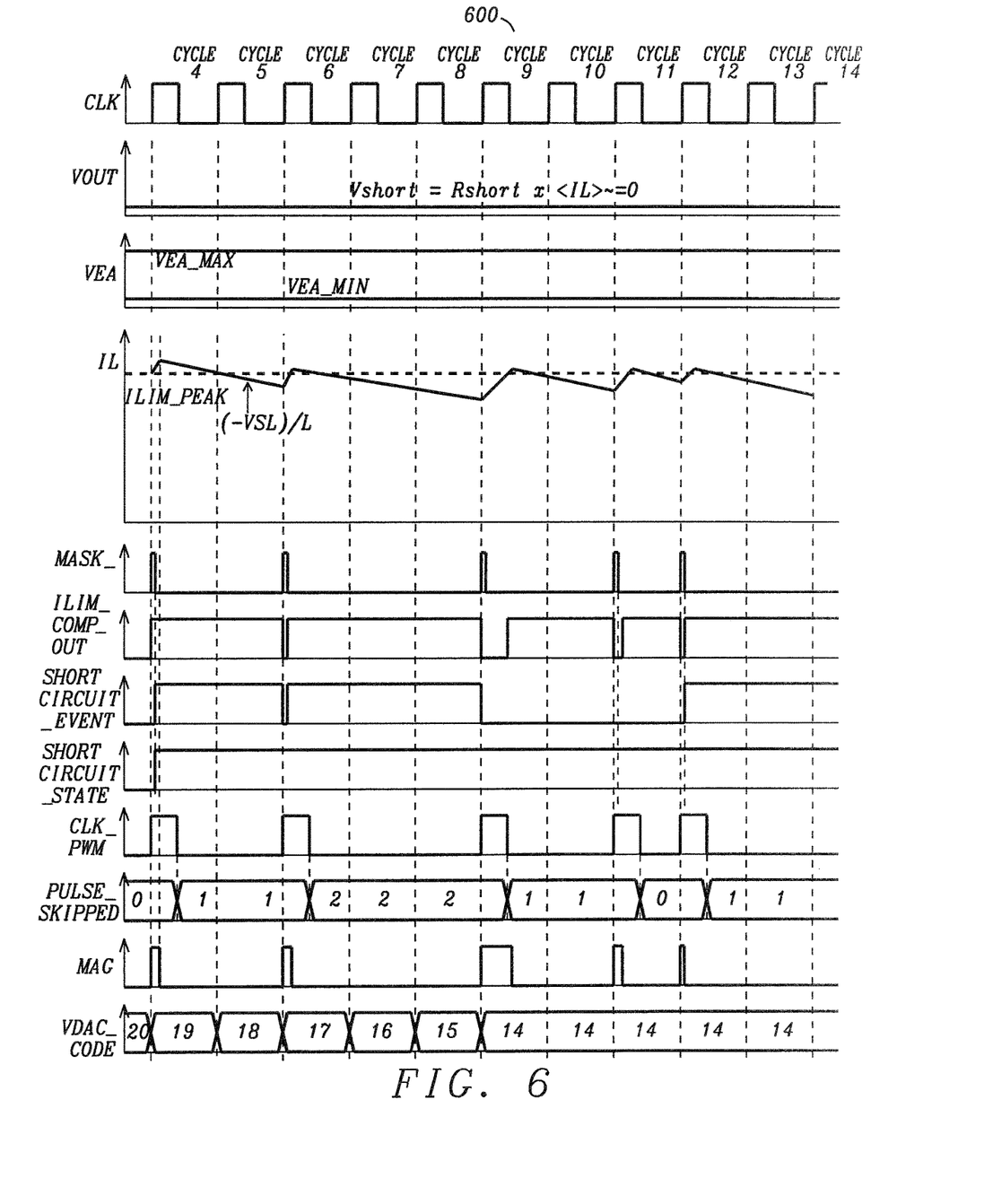
FIG. 6 is a timing diagram illustrating over-current limitation and pulse skipping during short circuit protection, in a first preferred embodiment of the present disclosure.

FIG. 6 is a timing diagram illustrating over-current limitation and pulse skipping during short circuit protection. During Cycle 5, CLK comes up but CLK_PWM stays low as a result of PULSE_SKIPPED=1. The buck converter remains in demagnetization with MAG low until CLK comes back up again in the next cycle. IL decreases a bit further, below ILIM_PEAK, to hopefully stop ILIM_COMP_OUT going high when MASK_ON is low. If ILIM_COMP_OUT does not stay low, then PULSE_SKIPPED will be incremented and 2 pulses will be skipped now instead of 1.

During Cycle 6, CLK (=CLK_PWM as there is no pulse skipped) comes up which triggers MAG. VOUT remains shorted and VEA stays at its maximum VEA_MAX. IL has remained quite high as there was almost no demagnetization of the inductor during the previous demagnetization phase. IL is increasing at a rate of (VIN−VOUT)/L, approaching VIN/L.IL and becomes larger than ILIM_PEAK in few nanoseconds. MASK_ON comes up with CLK_PWM and then goes low. As MASK_ON goes low, IL_COMP_OUT has already triggered high due to IL>ILIM_PEAK. IL_COMP_OUT stops the magnetization, and demagnetization starts shortly after this, with MAG going low. ILIM_COMP_OUT being high when MASK_ON goes low triggers SHORTCIRCUIT_EVENT and SHORTCIRCUIT_STATE high. CLK_PWM going low causes PULSE_SKIPPED to program 2 pulses to skip the next time that CLK comes up.

During Cycle 7 and 8, CLK comes up but CLK_PWM stays low. The buck converter remains in demagnetization, with MAG low, until CLK (and CLK_PWM) come back up again. The pulse skipper plays its role and PULSE_SKIPPED lets IL decrease a bit further to hopefully stop ILIM_COMP_OUT going high when MASK_ON goes low. If this does not happen then PULSE_SKIPPED will be incremented and 3 pulses will be skipped the next time that CLK comes up.

During Cycle 9, CLK (=CLK_PWM as there is no pulse skipped) comes up which triggers MAG. VOUT remains shorted and VEA stays at its maximum VEA_MAX. IL has remained quite high as there was almost no demagnetization of the inductor. IL is increasing at a rate of (VIN−VOUT)/L, approaching VIN/L. IL becomes larger than ILIM_PEAK in few nanoseconds. MASK_ON comes up with CLK_PWM and then goes low. As MASK_ON goes low, IL_COMP_OUT hasn't triggered high due to IL<ILIM_PEAK, and SHORTCIRCUIT_EVENT goes low. As this happens the counter is decremented by 1 and SHORTCIRCUIT_STATE remains high until the counter has reached 0. When IL becomes larger than ILIM_PEAK, then IL_COMP_OUT goes up. IL_COMP_OUT stops the magnetization and the demagnetization starts shortly after this, with MAG going low. CLK_PWM going low causes PULSE_SKIPPED to program 1 pulse to skip the next time that CLK comes up.

During Cycle 10, CLK comes up but CLK_PWM stays low. The buck converter remains in demagnetization, with MAG low, until CLK comes back up again. The pulse skipper plays its role and PULSE_SKIPPED lets IL decrease a bit further to hopefully stop ILIM_COMP_OUT going high when MASK_ON goes low. If this does not happen then PULSE_SKIPPED will be incremented and 2 pulses will be skipped the next time that CLK comes up.

During Cycle 11, CLK (=CLK_PWM as there is no pulse skipped) comes up, which triggers MAG. VOUT remains shorted and VEA stays at its maximum, VEA_MAX. IL has remained quite high as there was almost no demagnetization of the inductor. IL is increasing at a rate of (VIN−VOUT)/L, approaching VIN/L. IL becomes larger than ILIM_PEAK in few nanoseconds. MASK_ON comes up with CLK_PWM and then goes low. As MASK_ON goes low, IL_COMP_OUT hasn't triggered high due to IL<ILIM_PEAK. When IL becomes larger than ILIM_PEAK, then IL_COMP_OUT goes up. IL_COMP_OUT stops the magnetization and the demagnetization starts shortly after this, with MAG going low. CLK_PWM going low causes PULSE_SKIPPED to program 0 pulses to skip the next time that CLK comes up.

During Cycle 12, CLK (=CLK_PWM as there is no pulse skipped) comes up which triggers MAG. VOUT remains shorted and VEA stays at its maximum, VEA_MAX. IL has remained quite high as there was almost no demagnetization of the inductor. IL is increasing at a rate of (VIN−VOUT)/L, approaching VIN/L. IL becomes bigger than ILIM_PEAK in a few nanoseconds. MASK_ON comes up with CLK_PWM and then goes low. As MASK_ON goes low, IL_COMP_OUT has already triggered high due to IL>ILIM_PEAK. IL_COMP_OUT stops the magnetization and the demagnetization starts shortly after this, with MAG going low. ILIM_COMP_OUT being high when MASK_ON goes low triggers SHORTCIRCUIT_EVENT and SHORTCIRCUIT_STATE high. CLK_PWM going low causes PULSE_SKIPPED to program 1 pulse to skip the next time that CLK comes up.

During Cycle 13, CLK comes up but CLK_PWM stays low. The buck converter remains in demagnetization, with MAG low, until CLK comes back up again. The pulse skipper plays its role and PULSE_SKIPPED lets IL decrease a bit further to hopefully stop ILIM_COMP_OUT going high when MASK_ON goes low. If this does not happen then PULSE_SKIPPED will be incremented and 2 pulses will be skipped the next time that CLK comes up. If the short is released or stopped while in demagnetization phase then VOUT remains low since there is no current from the buck converter to charge it.

The general impression from FIG. 6 is that the buck converter in the disclosure is self-regulating such that IL<ILIM_PEAK. A sort of hysteretic mode settles with a pattern of N up to N+2 pulses to skip, set by PULSE_SKIPPED, dependent on the states of SHORTCIRCUIT_EVENT, SHORTCIRCUIT_STATE, and CLK_PWM. This method reuses existing analog circuits to gain over-current protection. Only a small amount of additional digital logic is required to handle over-current pulse skipping and recovery.

Figure 7:
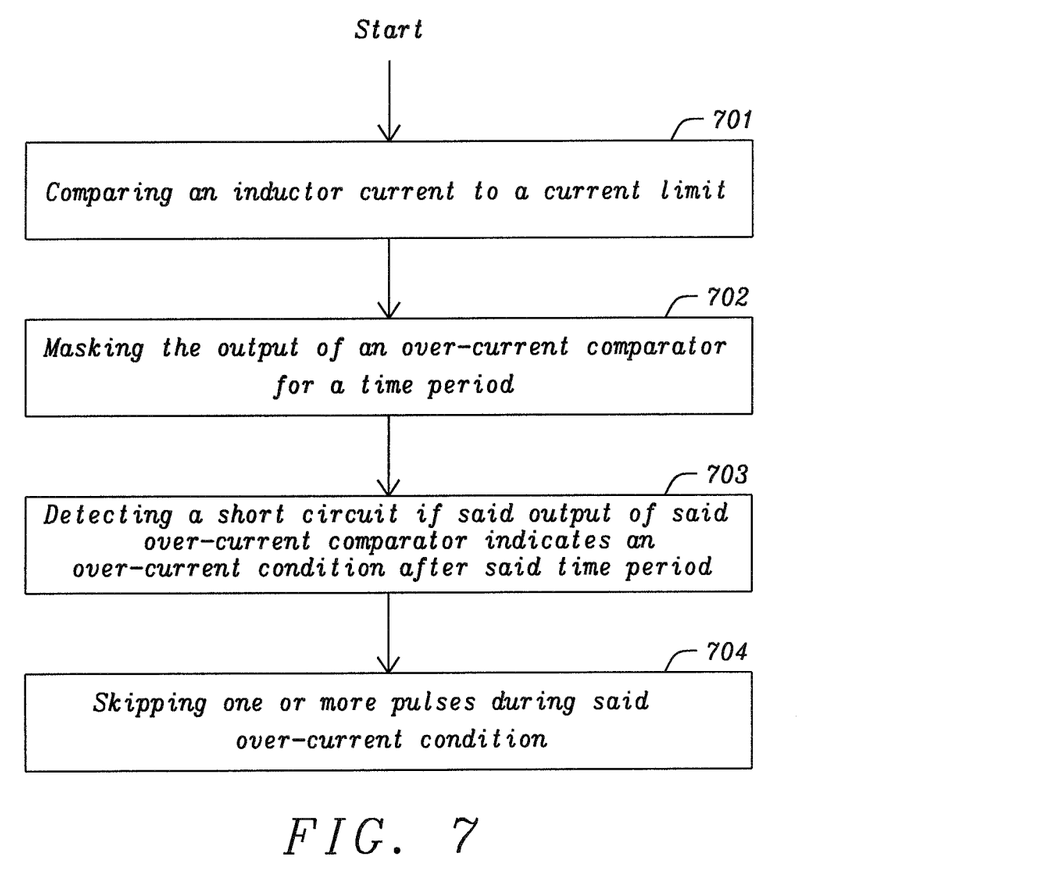
FIG. 7 shows a flowchart of a method disclosed for short circuit protection.

FIG. 7 shows a flowchart of a method disclosed for short circuit protection. The method for short circuit protection features, in 701, the provision to compare an inductor current to a current limit and, in 702, to mask the output of an over-current comparator for a time period. The method for short circuit protection also features, in 703, the provision to detect a short circuit event if the output of the over-current comparator indicates an over-current condition after the time period and, in 704, to skip one or more pulses during the over-current condition.

The above disclosure could apply to other types of switching converters such as boost converters, buck-boost converters, single-ended primary-inductor converters (SEPIC), or Cuk converters, if the converter is operated using current loop mode control.

Advantages

The advantages of one or more embodiments of the present disclosure include a buck converter using existing circuits to implement effective short-circuit/over-current protection. No additional protection circuits are needed in the case of current-mode loop regulation. The present disclosure provides a lower current limit, a faster response, and a natural soft-restart, as compared to previously known techniques, from overcurrent due to a short-circuit. There is no need to turn off the buck converter in the event of a short and it self regulates below an acceptable maximum peak current.

While particular embodiments of the present disclosure have been illustrated and described, it will be understood by those skilled in the art that various changes in form and details may be made without departing from the spirit and scope of this disclosure.

What is claimed is:

1. A switching converter having short circuit protection, comprising:
   a) an over-current comparator configured to detect an inductor current exceeding a current limit;
   b) a masking delay generator configured to mask information provided by said over-current comparator for a time period;
   c) short circuit detection logic configured to detect if said over-current comparator indicates an over-current condition after said time period,
   and configured to exit said over-current condition such that said switching converter self regulates below an acceptable maximum peak current, in a hysteretic mode, with a pattern of N up to N+2 skipped pulses, using a counter, where N is a number dependent on a short circuit event;
   d) a pulse skipper for skipping one or more of said skipped pulses during said over-current condition, wherein exiting said over-current condition is configured when a switching frequency is less than a peak limit for more than a predefined amount of clock cycles; and
   e) a regulation loop comprising a flip-flop, configured to provide a magnetization signal to a first switch, and a demagnetization signal to a second switch;
   wherein said switching converter is configured to exit said short-circuit event and remain enabled at all times.

2. The switching converter having short circuit protection of claim 1, wherein said over-current comparator is configured to be a current or a voltage comparator.

3. The switching converter having short circuit protection of claim 1, wherein said masking delay generator is configured to mask false over-current triggers caused by switching-induced glitches and to detect genuine over-current events at an end of said time period.

4. The switching converter having short circuit protection of claim 1, wherein outputs of said over-current comparator and said masking delay generator are configured to detect said short circuit event in said switching converter.

5. The switching converter having short circuit protection of claim 1, wherein outputs of said over-current comparator and said masking delay generator are configured to regulate switching frequency such that when the output of said over-current comparator is high and the output of said masking delay generator is low, the switching frequency is decreased and a pulse is skipped and the counter is incremented by 1, in said pulse skipper.

6. The switching converter having short circuit protection of claim 1, wherein outputs of said over-current comparator and said masking delay generator are configured to regulate switching frequency such that when the output of said over-current comparator is low and the output of said masking delay generator is low, the switching frequency is increased and the counter is decremented by 1, in said pulse skipper.

7. The switching converter having short circuit protection of claim 1, wherein said short circuit detection logic is configured to control magnetization and regulate said inductor current below an acceptable maximum peak current.

8. The switching converter having short circuit protection of claim 1, wherein said short circuit detection logic is configured to transition from demagnetization to magnetization, by closing a said first switch and opening a said second switch, and configured to transition from magnetization to demagnetization, by opening said first switch and closing said second switch.

9. The switching converter having short circuit protection of claim 1, wherein circuits are configured to implement effective short circuit and over current protection, requiring no additional protection circuits in a case of current mode loop regulation.

10. A method of short circuit protection, comprising steps of:
   a) comparing an inductor current to a current limit;
   b) masking an output of an over-current comparator for a time period;
   c) detecting a short circuit, by short circuit detection logic, if said output of said over-current comparator indicates an over-current condition after said time period, and exiting said over-current condition such that said switching converter self regulates below an acceptable maximum peak current;
   d) skipping one or more pulses during said over-current condition, in a hysteretic mode, with a pattern of N up to N+2 skipped pulses, using a counter, where N is a number dependent on a short circuit event,
   wherein exiting said over-current condition is configured when a switching frequency is less than a peak limit for more than a predefined amount of clock cycles; and
   e) providing a magnetization signal to a first switch, and a demagnetization signal to a second switch;
   and maintaining a steady state for a switching converter, providing a smooth recovery during said short-circuit event.

11. The method of short circuit protection of claim 10, wherein said over-current comparator comprises a current or a voltage comparator.

12. The method of short circuit protection of claim 10, wherein said short circuit detection logic detects said short circuit event when the output of said over-current comparator is greater than a peak limit of said over-current comparator.

13. The method of short circuit protection of claim 10, wherein said short circuit detection logic stops magnetization in a switching converter when said short circuit event is detected.

14. The method of short circuit protection of claim 10, wherein said short circuit detection logic transitions from demagnetization to magnetization in a switching converter when exiting said short circuit event.

15. The method of short circuit protection of claim 10, wherein a frequency of a switching converter is regulated by skipping one or more pulses, incrementing the counter, when said short circuit event is detected.

16. The method of short circuit protection of claim 10, wherein a frequency of a switching converter is regulated by decrementing the counter for skipping pulses, when exiting said short circuit event.

17. The method of short circuit protection of claim 10, wherein a current mode control loop uses an existing current sensing circuit to implement over current protection.

* * * * *